(12) United States Patent
Dachiku

(10) Patent No.: US 8,594,181 B2
(45) Date of Patent: Nov. 26, 2013

(54) MULTI-DECODER AND METHOD

(75) Inventor: Kenshi Dachiku, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1247 days.

(21) Appl. No.: 12/035,253

(22) Filed: Feb. 21, 2008

(65) Prior Publication Data

US 2008/0232461 A1 Sep. 25, 2008

(30) Foreign Application Priority Data

Mar. 19, 2007 (JP) ................................ 2007-070926

(51) Int. Cl.
H04N 7/18 (2006.01)
H04N 7/12 (2006.01)

(52) U.S. Cl.
USPC ............ 375/240.01; 375/240.25; 375/240.28; 348/390; 348/402; 348/397; 709/213; 709/102

(58) Field of Classification Search
USPC .......... 375/240.01, 240.25, 240.28; 709/213, 709/102; 341/50; 348/390, 402, 397, 512
See application file for complete search history.

(56) References Cited

U.S. PATENT DOCUMENTS 5,495,291 A * 2/1996 Adams ..................... 375/240.25
5,650,781 A * 7/1997 Park ................................ 341/67
6,285,405 B1 * 9/2001 Binford et al. ................ 348/512
6,678,331 B1 * 1/2004 Moutin et al. ............ 375/240.25
2004/0140916 A1 * 7/2004 Ji ..................................... 341/50

FOREIGN PATENT DOCUMENTS

JP 2005-11453 1/2005
WO WO 2006/025489 3/2006

OTHER PUBLICATIONS

Notification of Reasons for Rejection issued by the Japanese Patent Office in Japanese Patent Application No. 2007-070926, mailed Jan. 6, 2009.

* cited by examiner

Primary Examiner — Andrew Chriss
Assistant Examiner — Jamal Javaid
(74) Attorney, Agent, or Firm — Finnegan, Henderson, Farabow, Garrett & Dunner, LLP

(57) ABSTRACT

A multi-decoder includes a plurality of decoders for different types of coding, an output buffer which stores and outputs the decoded output signal output from the decoders, an output switcher which selectively outputs the decoded output signal of the output buffer, and a controller which determines a coding scheme of the stream based on data of the header area of a stream inputted to each of the decoders, and outputs the stream to the corresponding decoder based on the determination result, and controls the output switcher to switch a decoded output signal of a sender to another decoded output signal, when inputting a stream switching signal.

7 Claims, 5 Drawing Sheets

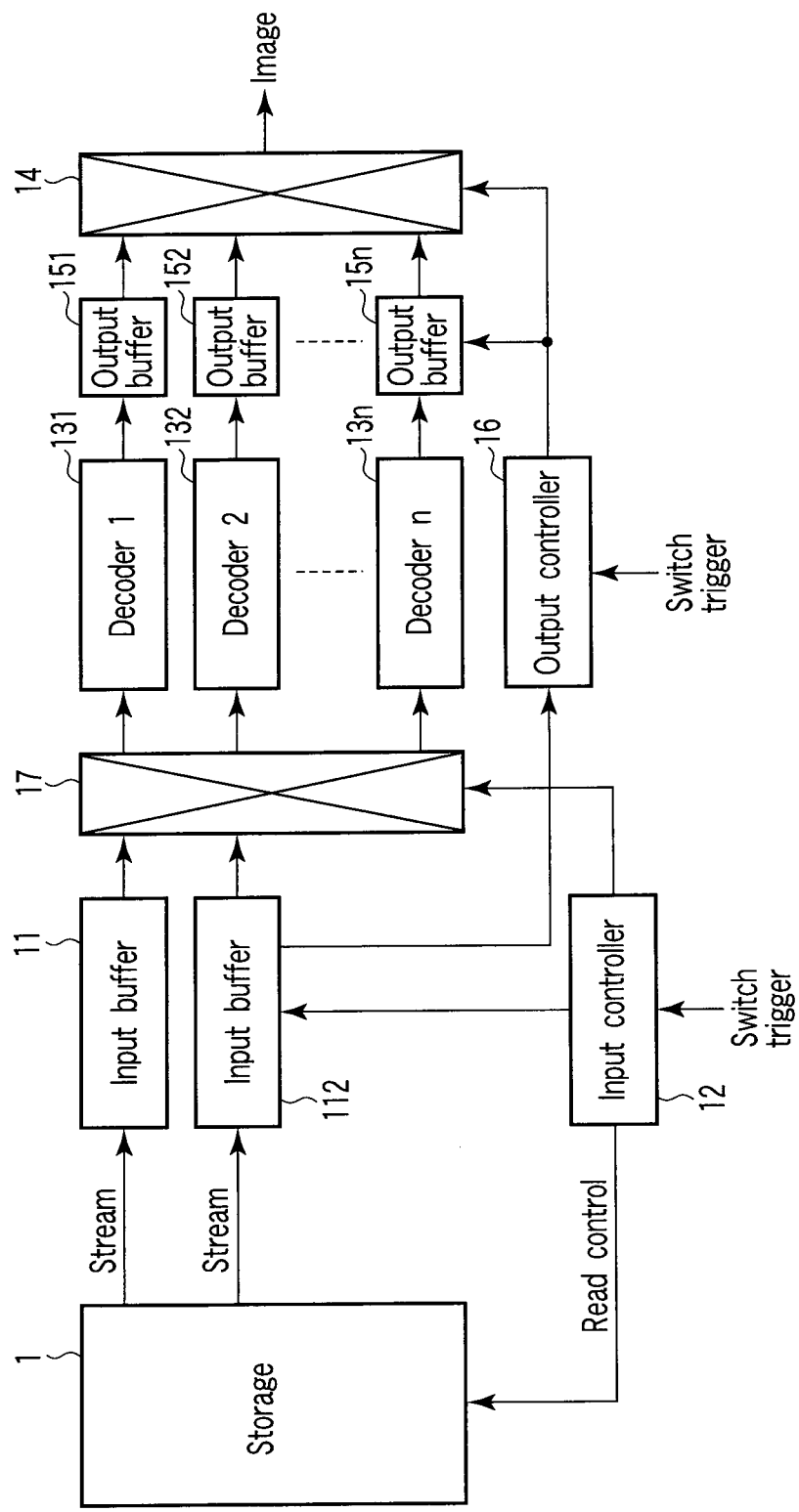
F I G. 1

Case where decoding delay difference is two frames

FIG. 2A Stream A
FIG. 2B Stream B
FIG. 2C Output of decoder A
FIG. 2D Output of decoder B
FIG. 2E Final output

MULTI-DECODER AND METHOD

CROSS-REFERENCE TO RELATED APPLICATIONS

This application is based upon and claims the benefit of priority from prior Japanese Patent Application No. 2007-070926, filed Mar. 19, 2007, the entire contents of which are incorporated herein by reference.

BACKGROUND OF THE INVENTION

1. Field of the Invention

The present invention relates to a multi-decoder, which selectively switches a plurality of streams having mutually different coding to effect decoding, and to a coding method.

2. Description of the Related Art

In recent years, ground digital broadcasting has started, and thereby, broadcasting stations handle various compression coding video signals, such as MPEG2 (Moving Picture Experts Group 2), MPEG4 and M-JPEG.

Such broadcasting stations require confirmation of a broadcasting material stream by an operator. For this reason, a decoder for decoding the broadcasting material stream to the original video signal is needed. At the broadcasting station, various types of decoder, as well as a multi-decoder, which is capable of switching between various compression coding streams, are used to reproduce the broadcasting material stream.

In such an environment, the decoding delay between decoders differs. For this reason, when an input stream is switched, a video image is instantaneously stopped, and blackout occurs, which also leads to synchronization confusion.

Conventionally, there has been proposed a digital information recorder that smoothly realizes switching of stream between different coding techniques (e.g., Jpn. Pat. Appln. KOKAI Publication No. 2005-11453).

However, the foregoing recorder only manages the timing between coding techniques when the stream is coded, and does not switch between various compression coding streams when decoding them.

BRIEF SUMMARY OF THE INVENTION

An object of the invention is to provide a multi-decoder, which can smoothly switch between a plurality of different coding streams without disturbing a video image, and to provide a decoding method.

According to an aspect of the invention, there is provided a multi-decoder selectively switching a plurality of streams to effect decoding, the streams including mutually different coding, and the streams being a frame structure including a header area and an information area, comprising: a plurality of decoders for different types of coding; an output buffer which stores and outputs the decoded output signal output from the decoders; an output switcher which selectively outputs the decoded output signal of the output buffer; and a controller which determines a coding scheme of the stream based on data of the header area of a stream inputted to each of the decoders, and outputs the stream to the corresponding decoder based on the determination result, and controls the output switcher to switch a decoded output signal of a sender to another decoded output signal, when inputting a stream switching signal.

According to another aspect of the invention, there is provided a multi-decoder selectively switching a plurality of streams to effect decoding, the streams including mutually different coding, and the streams being a frame structure including a header area and an information area, comprising: a plurality of decoders for different type of coding; an input buffer which temporarily holds an input stream; an input controller which determines a coding scheme of a stream based data of a header area of the stream held in the input buffer, and reads the stream from the input buffer based on the determination result to output the stream to the corresponding decoder; an output buffer which stores and outputs a decoded output signal output from the decoders; an output switcher which selectively outputs each decoded output signal of the output buffer; and an output controller which controls the output switcher to switch a decoded output signal of a sender to another decoded output signal, when inputting a stream switching instruction signal.

According to another aspect of the invention, there is provided a method of effecting decoding using a plurality of decoders different every coding, which selectively switches a plurality of streams, the streams including mutually different coding, and the streams being a frame structure including a header area and an information area, comprising: determining a coding scheme of a stream based on data of a header area of a stream inputted to each of the decoders; outputting the stream to the corresponding decoder based on the determination result; determining whether or not a decoding delay difference is more than one frame, when a stream switching instruction signal is input; outputting the switching destination stream to the corresponding decoder, before a time equivalent to the decoding delay difference from the stream switching time in a state of outputting the switching original stream to a decoder, when the decoding delay difference is more than one frame; and switching a signal from a switching original decoded output signal to a switching destination decoded output signal, and outputting it.

According to another aspect of the invention, there is provided a method of effecting decoding using a plurality of decoders different every coding, which selectively switches a plurality of streams, the streams including mutually different coding, and the streams being a frame structure including a header area and an information area, comprising: determining a coding scheme of a stream based on data of a header area of a stream inputted to each of the decoders; outputting the stream to the corresponding decoder based on the determination result; determining whether or not a decoding delay difference is more than one frame, when a stream switching instruction signal is input; and switching and outputting the switching destination decoded output signal from the switching original decoded output signal delayed by a time equivalent to the decoding delay difference, when the decoding delay difference is more than one frame.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a multi-decoder according to a first embodiment of the invention;

DETAILED DESCRIPTION OF THE INVENTION

Figure 2:
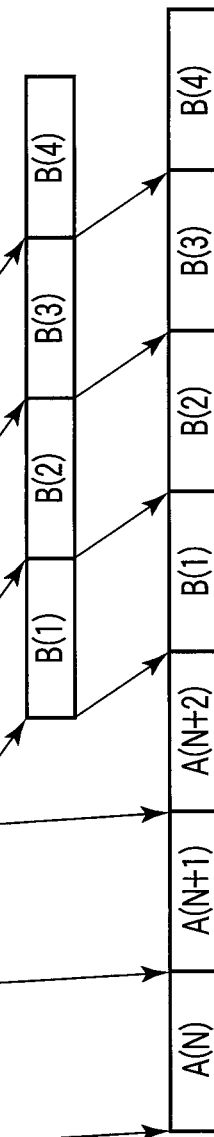
FIG. 2A is a view to explain an operation of a switching original stream in the first embodiment.
FIG. 2B is a view to explain an operation of a switching destination stream in the first embodiment.
FIG. 2C is a view to explain a decoding output operation of the switching original stream in the first embodiment.
FIG. 2D is a view to explain a decoding output operation of the switching destination stream in the first embodiment.
FIG. 2E is a view to explain an output signal of a output buffer in the first embodiment.

Various embodiments of the invention will be hereinafter described with reference to the accompanying drawings.

First Embodiment

FIG. 1 is a block diagram showing the configuration of a multi-decoder according to a first embodiment of the invention. The multi-decoder inputs a stream having a frame structure including a header and data output from a storage 1. The stream is temporarily held in input buffers 111 and 112. The stream held in these input buffers 111 and 112 is decoded in the following manner. Specifically, an input controller 12 analyzes header data to determine coding scheme, and thereafter, reads the header data to decode them using corresponding code scheme decoders 131 to 13n. Output signal from these input buffers 111 and 112 are decoded by corresponding code scheme decoders 131 to 13n.

Decoded output signals from these decoders 131 to 13n are stored in output buffers 151 to 15n. Decoded output signals from these output buffers 151 to 15n are selectively output by an output switcher 14.

An output controller 16 controls the switching of the foregoing output switcher 14 in units of frames.

The input controller 12 analyzes the header data of the stream held in the input buffers 111 and 112 to determine the kind of the stream. Thereafter, the input controller 12 sends a stream shown in FIG. 2A to the corresponding decoder 131. In this case, if the operator manually switches the stream without automatically switching it, the operator makes a switch into the decoder corresponding to the stream using the input switcher 17.

The input controller 12 determines that the decoding delay difference is several frames from the header data of a switching original stream of the input buffers 111 and that of a switching destination stream stored in the input buffer 112 or the storage 1. In this case, when receiving a switching trigger from an upper system, the input controller 12 reads a stream shown in FIG. 2B from the input buffer 112 or storage 1 in a period of time that is shorter than that of the decoding delay from the time when the output switcher 14 switches the stream. Thereafter, the input controller outputs the stream to the corresponding decoder 132. In this case, the input buffer 111 is in a state of outputting the switching original stream to the corresponding decoder 131.

Each output of the decoders 131 and 132 is as shown in FIG. 2C and FIG. 2D, which is then input to the output buffers 151 and 152. When receiving a signal (switching trigger) such that an input stream is switched, the output controller 16 switches the output switcher 14 to selectively output each decoded output signal of output buffer 151 and 152.

The output buffer 15 taking output timing to read the stream, and as shown in FIG. 2E, the delay difference within one frame is absorbed and synchronized.

Figure 3:
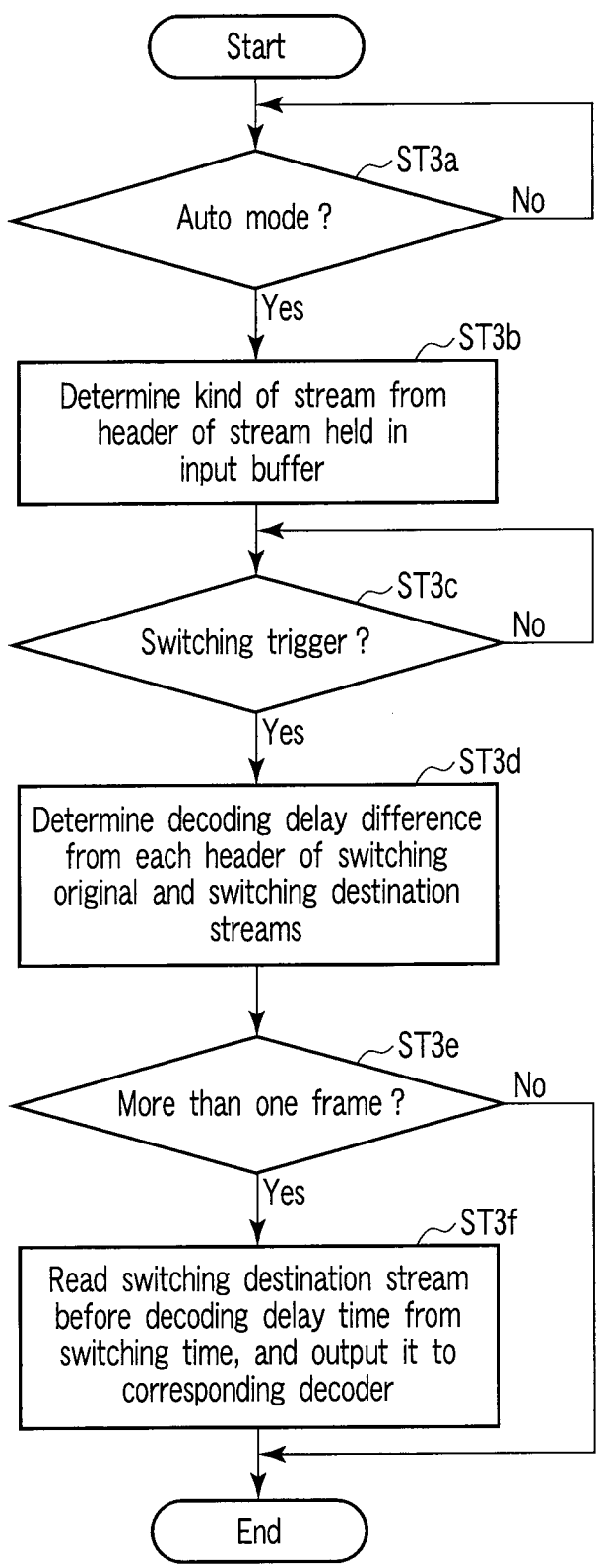
FIG. 3 is a flowchart to explain an operation by an input controller in the first embodiment.

FIG. 3 is a flowchart to explain the procedures performed by the input controller 12.

The input controller 12 determines whether or not auto mode is set (step ST3a). If the auto mode is set (Yes), the input controller 12 determines the kind of stream from the header of the streams held in the input buffers 111 and 112 (step ST3b).

The input controller 12 determines whether or not a switching trigger is input from a system upstream (step ST3c). If the switching trigger is input (Yes), the controller 12 determines the decoding delay difference based on the header of the switching original stream held in the input buffer 111 and that of the switching destination stream held in the input buffer 112 (step ST3d). For example, the controller 12 determines whether or not the difference is more than one frame (step ST3e). If the difference is less than one frame (No), the input controller 12 intactly outputs the switching destination stream to the corresponding decoder 132.

Conversely, if the difference is more than one frame (Yes), the input controller 12 previously reads the switching destination stream in a period of time that is shorter than that of the decoding delay from the time when the output switcher 14 switches the stream. Then, the controller 12 outputs the stream to the corresponding decoder 132 (step ST3f).

When receiving the switching trigger, the output controller 16 switches the output switcher 14 to selectively output each decoded output signal of the output buffers 151 and 152.

As described above, according to the first embodiment, the decoding delay difference within one frame between decoders 131 to 13n is absorbed using the input and output buffers 111 to 11n and 15 as input and output stages of decoders 131 to 13n. The input controller 12 determines the decoding delay difference using the header data of the switching original stream held in the input buffers 111 to 11n and that of the switching destination stream held in the input buffer 111 to 11n or supplied separately by a system upstream. If the delay difference is more than one frame, the output controller 16 controls the switching of the output switcher 14 in the following manner. Specifically, in a state that the switching original stream from the input buffer 111 to 11n is read, the input buffers 111 to 11n or stream sender reads the switching destination stream in a period of time that is shorter than that of the decoding delay difference when the stream is switched. The switching destination stream is output to the corresponding decoder 132 so that the timing of input to the output switcher 14 is synchronized between the switching original stream and the switching destination stream.

Therefore, the output controller 16 readily controls the switching timing of the output switcher 14. In this way, it is possible to smoothly switch a plurality of streams having different coding to reproduce an uninterrupted video image.

Second Embodiment

Figure 4:
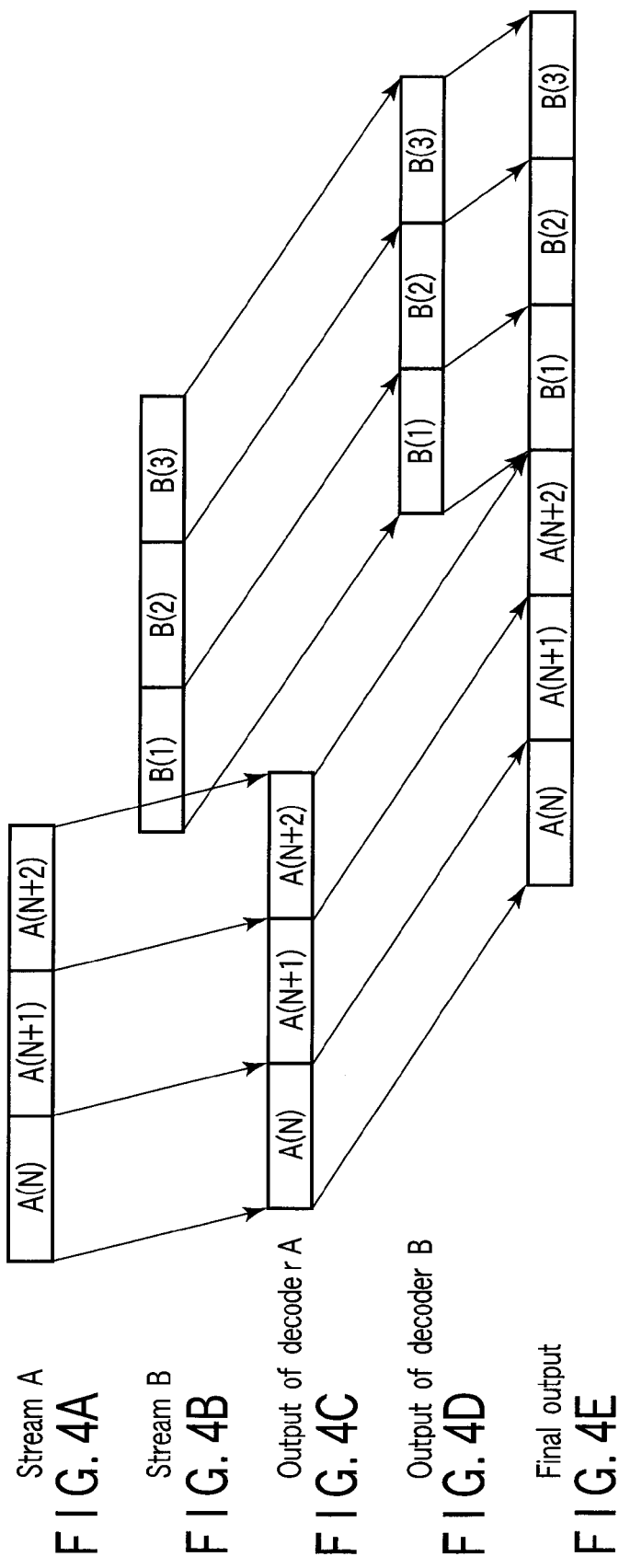
FIG. 4A is a view to explain an operation of a switching original stream according to a second embodiment.
FIG. 4B is a view to explain an operation of a switching destination stream in the second embodiment.
FIG. 4C is a view to explain a decoding output operation of the switching original stream in the second embodiment.
FIG. 4D is a view to explain a decoding output operation of the switching destination stream in the second embodiment.
FIG. 4E is a view to explain an output signal of a output buffer in the second embodiment.

FIG. 4 shows stream switching timing according to a second embodiment of the invention.

The input controller 12 analyzes header data of a stream held in the input buffer 11 to determine the kind of the stream. The controller sends a stream shown in FIG. 4A to the corresponding decoder 131.

A stream shown in FIG. 4B is input to the decoder 132.

The decoded output signals of the decoders are as shown in FIG. 4C and FIG. 4D. These signals are then input to the output switcher 14. When receiving a switching trigger, the output controller 16 determines whether or not the decoding delay difference of the decoder is several frames from header data of the switching original stream of the input buffer 111 and that of the switching destination stream in the input buffer 112 or output from the storage 1. If the decoding delay difference is several frames, the output switcher 14 is switched, delayed by the decoding delay of the decoder, to selectively output each decoded output signal of the output buffers 151 and 152.

As shown in FIG. 4E, the output buffer 15 reads frames in synchrony with the output timing, and controls the difference between write address and read address so that the amount of the decoder delay and the delay of the output buffer 15 become constant.

Figure 5:
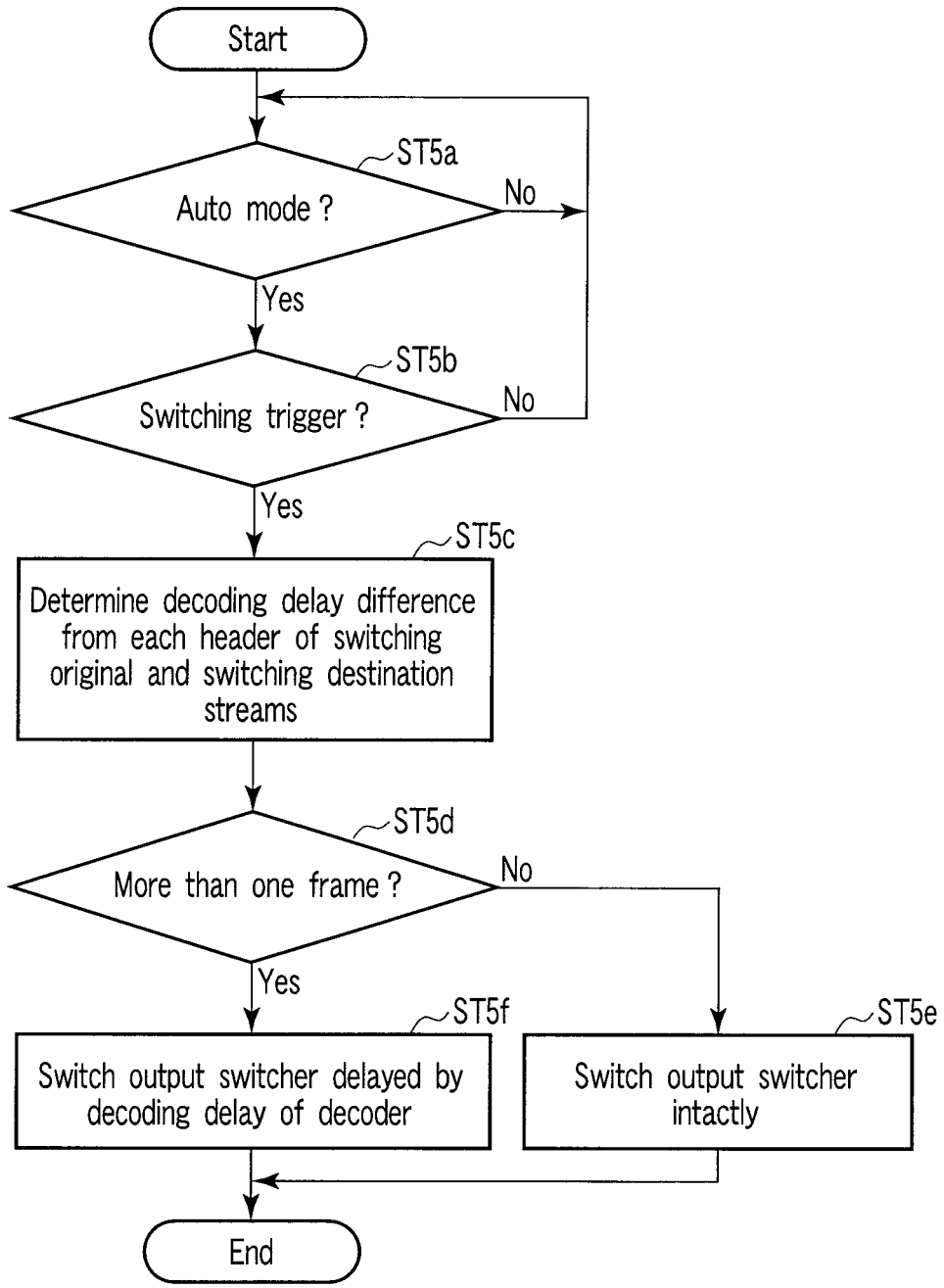
FIG. 5 is a flowchart to explain an operation by an output controller in the second embodiment.

FIG. 5 is a flowchart to explain the procedure performed by the output controller 16.

The output controller 16 determines whether or not auto mode is set (step ST5a). If the auto mode is set (Yes), the output controller 1 determines whether or not a switching trigger is input from the upper system (step ST5b).

If the switching trigger is input (Yes), the output controller 16 determines the decoding delay difference based on the header of the switching original stream held in the input buffer 111 and that of the switching destination stream held in the input buffer 112 (step ST5c). For example, the controller 16 determines whether or not the difference is more than one frame (step ST5d).

If the difference is less than one frame (No), the output controller 16 intactly switches the output switcher 14 from a switching original decoded output signal to a switching destination decoded output signal (step ST5e).

Conversely, if the difference is more than one frame (Yes), the output controller 16 switches the output switcher 14 delayed by the decoding delay of the decoder to selectively output each decoded output signal of the output buffers 151 and 152.

As described above, according to the second embodiment, even if the stream is input to the decoders 131 to 13n in a state that the timing is not synchronized between decoders 131 to 13n, the output controller 16 controls the timing. Thus, the same effect as in the first embodiment is obtained.

The present invention is not limited to the foregoing embodiments. In this case, the configuration of the multi-decoder and stream switching procedures may be variously modified departing from the subject matter of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multi-decoder selectively switching a plurality of streams to effect decoding, the streams including mutually different coding, and the streams being a frame structure including a header area and an information area, comprising:
    a plurality of decoders for different types of coding;
    an input buffer connected to input sides of the respective decoders via respective lines for transmitting the streams of mutually different coding to the decoders simultaneously, and configured to temporarily hold a stream input to each of the decoders, wherein the streams include a switching original stream and a switching destination stream;
    an output buffer configured to store and output the decoded output signal output from the decoders;
    an output switcher configured to selectively output the decoded output signal of the output buffer; and
    a controller configured to:
        determine a decoding delay difference based on data of the header area of the switching original stream and data of the header area of the switching destination stream stored in the input buffer,
        determine whether or not the decoding delay difference is more than one frame, and to generate a result, when the decoding delay difference is more than one frame,
        read out the switching destination stream from the input buffer when the decoding delay difference does not exceed one frame and read out the switching destination stream from the input buffer in a period of time shorter than the decoding delay difference after a last decoded output signal is switched, when the decoding delay difference is more than one frame,
        output the switching destination stream to the corresponding decoder, and
        control the output switcher to delay switching of a decoded output signal of a sender to another decoded output signal by the time equivalent to the decoding delay difference, in response to the result, when inputting a stream switching signal.

2. The multi-decoder according to claim 1, wherein the controller includes:
    an input controller configured to determine a coding scheme of the stream based on data of the header area of a stream input to each of the decoders, and outputs the stream to the corresponding decoder based on the determination result; and
    an output controller configured to control the output switcher to switch a decoded output signal of a sender to another decoded output signal, when inputting a stream switching signal.

3. The multi-decoder according to claim 1, wherein the controller includes:
    a unit configured to output the switching destination stream to the corresponding decoder before a time equivalent to the decoding delay difference from the stream switching time in a state of outputting the switching original stream to a decoder, in response to the result.

4. A multi-decoder selectively switching a plurality of streams to effect decoding, the streams including mutually different coding, and the streams being a frame structure including a header area and an information area, comprising:
    a plurality of decoders for different type of coding;
    an input buffer connected to input sides of the decoders via respective lines for transmitting the streams of mutually different coding to the respective decoders simultaneously, and configured to temporarily hold a stream input to each of the decoders, wherein the streams include a switching original stream and a switching destination stream;

an input controller configured to determine a decoding delay difference based on data of a header area the switching original stream and data of the header area of the switching destination stream held in the input buffer, determine whether or not the decoding delay difference is more than one frame, and to generate a result, when the decoding delay difference is more than one frame, and read the switching destination stream from the input buffer when the decoding delay difference does not exceed one frame and read out the switching destination stream from the input buffer in a period of time shorter than the decoding delay difference after a last decoded output signal is switched, when the decoding delay difference is more than one frame, to output the switching destination stream to the corresponding decoder;

an output buffer configured to store and output a decoded output signal output from the decoders;

an output switcher configured to selectively output each decoded output signal of the output buffer; and an output controller configured to control the output switcher to delay switching of a decoded output signal of a sender to another decoded output signal by the time equivalent to the decoding delay difference, in response to the result, when inputting a stream switching signal.

5. The multi-decoder according to claim 4, wherein the input controller includes:

a unit configured to read the switching destination stream from the input buffer or a stream sender to output the stream the corresponding decoder, before a time equivalent to the decoding delay difference from the stream switching time in a state of reading the switching destination stream, in response to the result.

6. A method of effecting decoding using a plurality of decoders different every coding, which selectively switches a plurality of streams, the streams including mutually different coding, and the streams being a frame structure including a header area and an information area, comprising:

temporarily holding a stream input to each of the decoders in an input buffer which is connected to input sides of the decoders via respective lines for transmitting the streams of mutually different coding to the respective decoders simultaneously, wherein the streams include a switching original stream and a switching destination stream;

determine a decoding delay difference based on data of the header area of the switching original stream and data of the header area of the switching destination stream stored in the input buffer;

reading out the switching destination stream from the input buffer when the decoding delay difference does not exceed one frame and read out the switching destination stream from the input buffer in a period of time shorter than the decoding delay difference after a last decoded output signal is switched, when the decoding delay difference is more than one frame, outputting the switching destination stream to the corresponding decoder;

determining whether or not a decoding delay difference is more than one frame, when a stream switching instruction signal is input;

outputting a switching destination stream from the input buffer or a stream sender to the corresponding decoder, before a time equivalent to the decoding delay difference from the stream switching time in a state of outputting the switching original stream to a decoder, when the decoding delay difference is more than one frame; and switching a signal from a switching original decoded output signal to a switching destination decoded output signal, and outputting it.

7. A method of effecting decoding using a plurality of decoders different every coding, which selectively switches a plurality of streams, the streams including mutually different coding, and the streams being a frame structure including a header area and an information area, comprising:

temporarily holding a stream input to each of the decoders in an input buffer which is connected to input sides of the decoders via respective lines for transmitting the streams of mutually different coding to the respective decoders simultaneously, wherein the streams include a switching original stream and a switching destination stream;

determine a decoding delay difference based on data of the header area of the switching original stream and data of the header area of the switching destination stream stored in the input buffer;

reading out the switching destination stream from the input buffer when the decoding delay difference does not exceed one frame and read out the switching destination stream from the input buffer in a period of time shorter than the decoding delay difference after a last decoded output signal is switched, when the decoding delay difference is more than one frame, outputting the switching destination stream to the corresponding decoder;

determining whether or not a decoding delay difference is more than one frame, when a stream switching instruction signal is input; and switching and outputting a switching destination decoded output signal from a switching original decoded output signal delayed by a time equivalent to the decoding delay difference, when the decoding delay difference is more than one frame.

* * * * *